United States Patent
Cannata

(10) Patent No.: US 12,235,748 B2
(45) Date of Patent: *Feb. 25, 2025

(54) PREDICTING APPLICATION PERFORMANCE FROM RESOURCE STATISTICS

(71) Applicant: Oracle International Corporation, Redwood Shores, CA (US)

(72) Inventor: Philip Eugene Cannata, Austin, TX (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/391,626

(22) Filed: Dec. 20, 2023

(65) Prior Publication Data

US 2024/0118987 A1 Apr. 11, 2024

Related U.S. Application Data

(63) Continuation of application No. 16/202,532, filed on Nov. 28, 2018, now Pat. No. 11,892,933.

(51) Int. Cl.
| | |
|---|---|
| G06F 11/00 | (2006.01) |
| G06F 11/30 | (2006.01) |
| G06F 11/34 | (2006.01) |
| G06N 3/04 | (2023.01) |
| G06N 20/00 | (2019.01) |

(52) U.S. Cl.
CPC ...... G06F 11/3452 (2013.01); G06F 11/3013 (2013.01); G06F 11/3409 (2013.01); G06F 11/3447 (2013.01); *G06N 3/04* (2013.01); *G06N 20/00* (2019.01)

(58) Field of Classification Search
CPC ............ G06F 11/3013; G06F 11/3409; G06F 11/3447; G06F 11/3452
See application file for complete search history.

(56) References Cited

U.S. PATENT DOCUMENTS

| | | |
|---|---|---|
| 8,898,096 B2 | 11/2014 | Caves et al. |
| 9,229,838 B2 | 1/2016 | Chang et al. |
| (Continued) | | |

FOREIGN PATENT DOCUMENTS

CN 102004671 B 3/2013

OTHER PUBLICATIONS

Berlinska, The statistical models of parallel applications performance, Annales UMCS Informatica AI 3 (2005) 199-204.

(Continued)

*Primary Examiner* — Joshua P Lottich
(74) *Attorney, Agent, or Firm* — Invoke

(57) ABSTRACT

Embodiments include systems and methods for generating a data throughput estimation model. A system may be monitored to measure both (a) data throughput and (b) computing statistics of one or more computing resources to generate an initial data set. The relationship between the data throughput and the computing statistics, in the initial data set, is used to generate a data throughput estimation model. The data throughput estimation model may be generated using a machine learning model, a neural network algorithm, boosting decision tree algorithm, and/or a random forest decision tree algorithm. Additional measurements of the computing resource statistics may be applied to the data throughput estimation model to estimate data throughput.

20 Claims, 9 Drawing Sheets

(56) References Cited

U.S. PATENT DOCUMENTS

| | | |
|---|---|---|
| 9,635,570 B2 | 4/2017 | Ronen et al. |
| 9,798,629 B1 | 10/2017 | Shilane et al. |
| 10,489,215 B1 | 11/2019 | Wen et al. |
| 2006/0010101 A1 | 1/2006 | Suzuki et al. |
| 2011/0320391 A1 | 12/2011 | Chen et al. |
| 2012/0041914 A1 | 2/2012 | Tirunagari |
| 2016/0078368 A1 | 3/2016 | Kakhandiki et al. |
| 2016/0350198 A1 | 12/2016 | Neuvirth-Telem et al. |
| 2017/0153963 A1 | 6/2017 | Chahal et al. |
| 2017/0220942 A1 | 8/2017 | Baldini et al. |
| 2019/0213099 A1 | 7/2019 | Schmidt et al. |

OTHER PUBLICATIONS

Jain et al., Predicting Application Performance using Supervised Learning on Communication Features, SC '13: Proceedings of the International Conference on High Performance Computing, Networking, Storage and Analysis.

Kundu et al., Application Performance Modeling in a Virtualized Environment, HPCA—16 2010 The Sixteenth International Symposium on High-Performance Computer Architecture.

MEASURED THROUGHPUT: LARGE DOTS

PREDICTED THROUGHPUT: SMALL DOTS

PREDICTING APPLICATION PERFORMANCE FROM RESOURCE STATISTICS

INCORPORATION BY REFERENCE; DISCLAIMER

The following application is hereby incorporated by reference: application Ser. No. 16/202,532 filed on Nov. 28, 2018. The applicant hereby rescinds any disclaimer of claims scope in the parent application(s) or the prosecution history thereof and advises the USPTO that the claims in the application may be broader than any claim in the parent application(s).

TECHNICAL FIELD

The present disclosure relates to resource statistics of a computing system, and in particular, predicting application performance from resource statistics.

BACKGROUND

Computing system resources are often monitored to determine usage and performance statistics. As an example, data throughput, thread migrations, and CPU utilization may all be measured. Usage and performance statistics may be used for resource planning purposes such as purchasing additional resources. Usage and performance statistics may be used to detect component failures and bottlenecks.

The approaches described in this section are approaches that could be pursued, but not necessarily approaches that have been previously conceived or pursued. Therefore, unless otherwise indicated, one should not assume that any of the approaches described in this section qualify as prior art merely by virtue of being included in this section.

BRIEF DESCRIPTION OF THE DRAWINGS

The embodiments are illustrated by way of example and not by way of limitation in the figures of the accompanying drawings. One should note that references to "an" or "one" embodiment in this disclosure are not necessarily to the same embodiment, and the references to "an" or "one" embodiment mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. General Overview

Embodiments include systems and methods for generating a data throughput estimation model. A system may be monitored to measure both (a) data throughput and (b) computing statistics of one or more computing resources to generate an initial data set. The relationship between the data throughput and the computing statistics, in the initial data set, is used to generate a data throughput estimation model. The data throughput estimation model may be generated using a machine learning model, a neural network algorithm, boosting decision tree algorithm, and/or a random forest decision tree algorithm. Additional measurements of the computing system resource statistics may be applied to the data throughput estimation model to estimate data throughput.

One or more embodiments described in this Specification and/or recited in the claims may not be included in this General Overview section.

2. Architectural Overview

Figure 1:
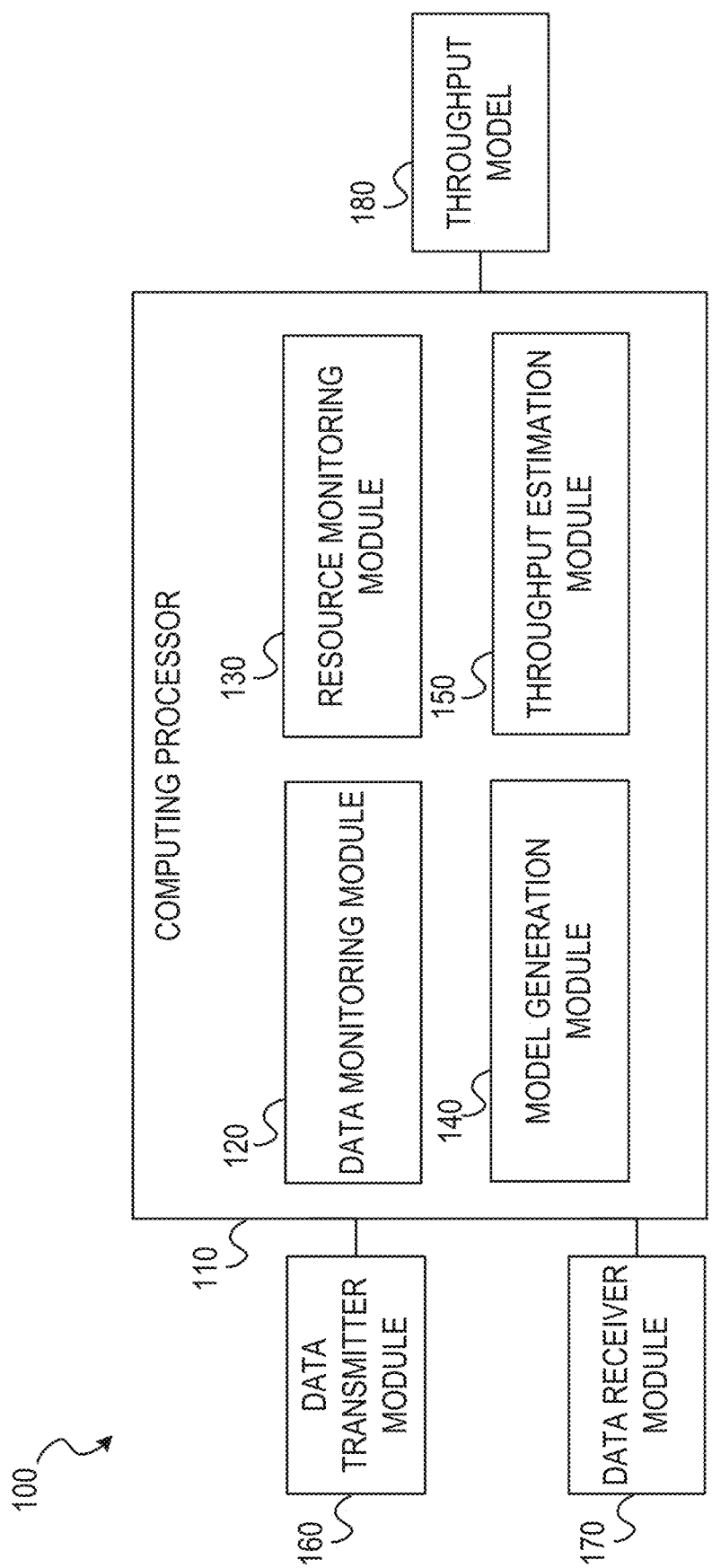
FIG. 1 shows a block diagram that illustrates components of a computing system in accordance with one or more embodiments.

FIG. 1 shows a block diagram that illustrates components of a computing system 100 in accordance with one or more embodiments. The computing system 100 may include a computing processor 110 that executes software applications, e.g., operating system software and/or application system software. The computing system 100 may communicate over a network via a data transmitter module 160 and a data receiver module 170. The computing processor 110 may transmit data via the data transmitter module 160 and receive data via the data receiver module 170. The computing processor 110 may transmit data to one or more other embodiments of the computing processor 110 over the network via the data transmitter module 160 and/or receive data from one or more other embodiments of the computing processor 110 over the network via the data receiver module 170.

A data monitoring module 120 may monitor data throughput through the data transmitter module 160, the data receiver module 170, or both the data transmitter module 160 and the data receiver module 170. The data monitoring module 120 may count data packets, bytes, and/or bits transmitted and/or received via the data transmitter module 160, the data receiver module 170, or both the data transmitter module 160 and the data receiver module 170. The data monitoring module 120 may take measurements of the data throughput for data transmissions corresponding to the computing system 100.

A resource monitoring module 130 may monitor resources of the computing system 100. The resource monitoring module 130 may calculate resource statistics of the computing system 100. The resource statistics may include processor, CPU, core, memory, cache, and/or thread statistics of the computing system 100. The resource statistics may include resource statistics such as operating system statistics or hardware statistics. The resource statistics may be saturation statistics that show how much of a resource has been consumed or utilization statistics that show a percentage of usage of the resource. Hardware statistics may also include a number of level 1 (L1), level 2 (L2), and/or level 3 (L3) cache misses, and instructions retired, for example.

The resource statistics may include:
minf: minor faults
xcal: inter-processor cross-calls
intr: interrupts
ithr: interrupts as threads (not counting clock interrupts)
csw: context switches
icsw: involuntary context switches
migr: thread migrations (to another processor)
smtx: spins on mutexes (lock not acquired on first try)
srw: spins on readers/writer locks (lock not acquired on first try)
syscl: system calls
usr: percent user time
sys: percent system time The resource statistics, as referred to herein, do not include measurements of the throughput for data transmissions corresponding to the computing system 100.

A model generation module 140 may utilize one or more of the outputs from the resource monitoring module 130, e.g., resource statistics, in combination with output from the data monitoring module 120, e.g., data throughput data, in a statistical machine learning algorithm or neural network algorithm to generate a model which computes a data throughput estimate as a function of the resource statistic, such as a resource statistic output from the resource monitoring module 130. The model generation module 140 may execute a statistical machine learning algorithm to generate the model, which may be a type of a decision tree, for example. The statistical machine learning algorithm may include a boosting decision tree algorithm or a random forest algorithm. In some embodiments, the model generation module 140 may execute a neural network algorithm to generate the model. Once the model is generated, the model may be output and stored as the throughput model 180.

A decision tree-based method for regression and classification involves stratifying or segmenting the predictor space into a number of simple regions by making decisions according to splitting rules. Random forests and boosting are techniques that are added to simple tree-based methods to produce multiple trees that are combined to yield a single consensus prediction with greater prediction accuracy. A boosting decision tree algorithm, for example, may be executed to generate a boosting decision tree model for the throughput model 180. The boosting decision tree model may be built as a sequence of decision trees with each new tree constructed from the residuals derived from the previous tree. A random forest algorithm, for example, may be executed to generate a random forest model for the throughput model 180. The random forest model may be built as a sequence of decision trees with each new tree constructed by forcing the decision split to consider a random subset of the predictors and thereby decorrelating the trees.

Various different resource statistics as monitored by the resource monitoring module 130 and input to the model generation module 140 may have different relative importance as predictors in the generated model. The sum of the different relative importances of the statistics may be 100%. Analysis of the relative importances of the statistics as well as the correlations between the statistics may be useful to determine how to improve throughput performance of the computing system 100. The throughput model 180 may identify which of the statistics may be most important or have the greatest impact relative to the other statistics to the data throughput of the computing system 100. The relative importance provides a clue as to how to approach improving the computing system 100.

Each of the resource statistics may be considered to have a marginal effect upon the system performance or data throughput of the computing system 100. Each of the resource statistics may be considered as a predictor in the throughput model 180, and the marginal effect on the data throughput of the computing system 100 may be considered to be the estimate of the effect of the predictor upon the predicted value of the throughput. The marginal effect of the predictor may be calculated by holding all of the other predictors' values at their average value, and varying the predictor of interest's value to see how the variations affects the predicted value of the data throughput. In other words, to calculate the partial dependence of the data throughput predicted by the throughput model 180 on a particular resource statistic, first a covariate of interest x would be selected. Then, a grid of evenly spaced values from x-min to x-max would be created. For every value in the grid, the entire dataset would be looped through and the predicted data throughput would be calculated. The average of all of the predicted data throughputs would be calculated for each x-value, holding all other covariates constant, thereby integrating out all the other variables. This average response may then be plotted on the y-axis as the partial dependence plot to indicate the marginal effect of a particular predictor on the data throughput of the throughput model 180, as shown in the examples of FIGS. 4-7 herein.

A throughput estimation module 150 may utilize the throughput model 180 at a future time to estimate throughput given resource statistics from the resource monitoring module 130. In various embodiments, the performance estimation output from the throughput estimation module 150 may be compared with actual throughput measurements from the data monitoring module 120 to determine whether there are discrepancies. If there are discrepancies detected, the throughput model 180 may be useful to identify root causes in the system 100 of the discrepancies and identify potential solutions.

Examples of operations performed by the client-server computing system 100 and computing system 100 are given below with reference to FIGS. 1-9.

3. Predicting Application Performance from Resource Statistics

Figure 2:
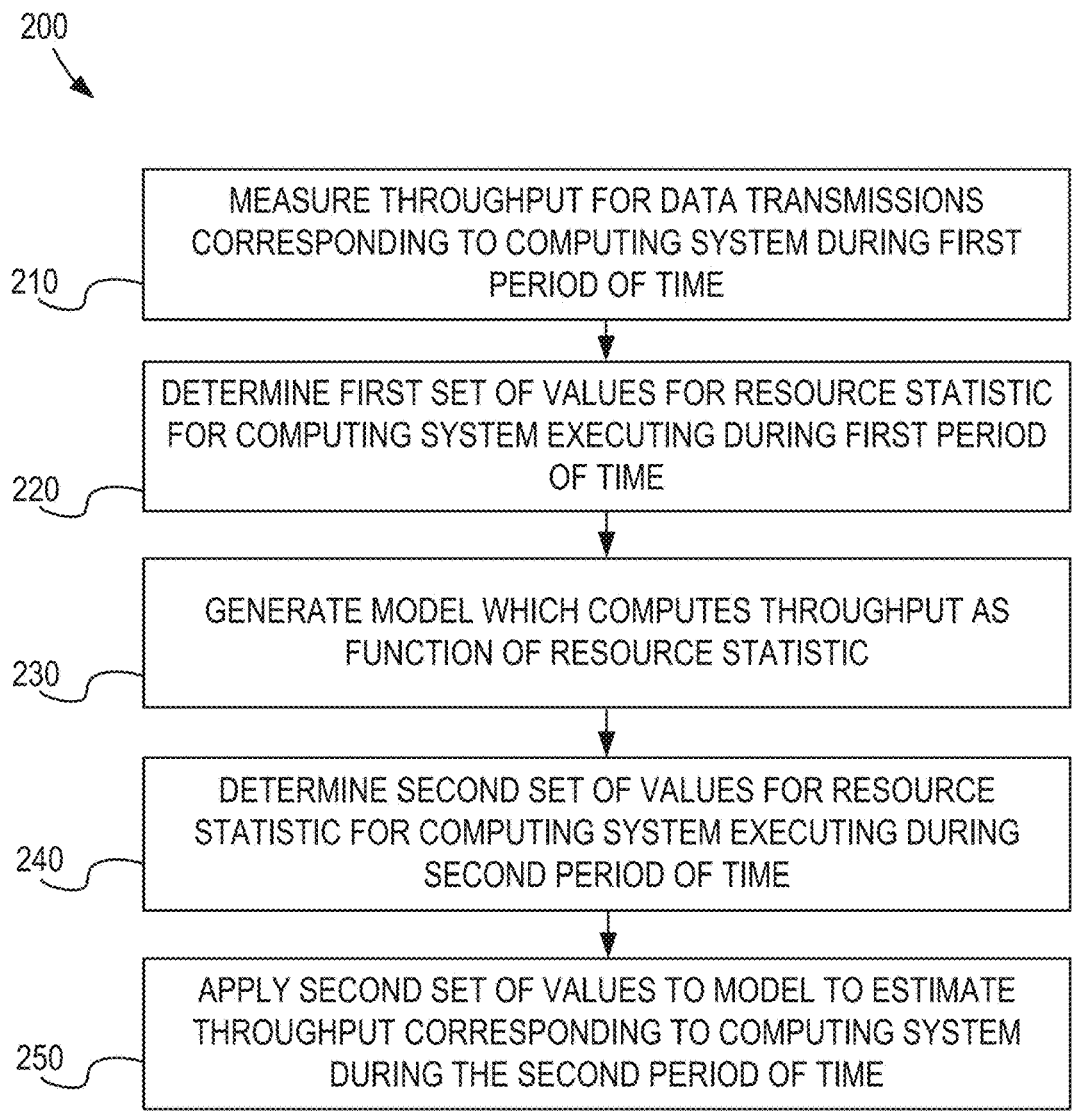
FIG. 2 shows a block diagram that illustrates an example set of operations of generating and applying a model which computes throughput as a function of a resource statistic of a computing system in accordance with one or more embodiments.

FIG. 2 is a flow chart that illustrates an example set of operations 200 of generating and applying a model which computes data throughput as a function of a resource statistic of a computing system in accordance with one or more embodiments. The computing system may be an embodiment of the computing system 100 illustrated in FIG. 1. The operations 200 may be performed by the computing system 100. One or more operations illustrated in FIG. 2 may be modified, rearranged, or omitted altogether. Accordingly, the particular sequence of operations illustrated in FIG. 2 should not be construed as limiting the scope of one or more embodiments. A detailed example is described below for purposes of clarity. Components and/or operations described below should be understood as one specific example which may not be applicable to certain embodiments. Accordingly, components and/or operations described below should not be construed as limiting the scope of any of the claims. In various embodiments, the operations 200 may be performed using the systems and components described above with reference to FIGS. 1-9.

To generate the model, the computing system 100 may perform a series of measurements while sending messages via a message sending application from a client machine to a server machine during a first period of time, which may be a training period when the model is generated. The model may be used during a subsequent second period of time to estimate the data throughput according to resource statistics. The message sending application may set a message size (e.g., in units of kilobits or kbits) and a number of data streams (which may be equivalent to a number of simultaneously processors executing). The message sending application may iterate through inner and outer loops to send messages of various sizes using various numbers of data streams from a starting message size up to an ending message size as well as from a starting number of streams to an ending number of streams. The message sending application may send the messages using these streams from the client to the server for a t period of time, e.g., one second, one minute, two minutes, three minutes, four minutes, five minutes, etc., or any time in between, while measuring the data throughput (Operation 210) received at the server and determining values for the resource statistics (Operation 220) of interest for building the model at the server. Alternatively, the computing system 100 may send messages using these streams from a client to a server for a t period of time while measuring the data throughput (Operation 210) transmitted at the client and determining values for the resource statistics (Operation 220) of interest for building the model at the client. There may be one or more resource statistics that are determined to be of interest for building the model.

Measuring data throughput may include counting a number of data packets, bytes, or bits transmitted through the data transmitter module 160 and/or received through the data receiver module 170. When a data packet, byte, or bit is transmitted or received, a memory register or variable may be incremented in memory to count the transmission or reception of that data packet, byte, or bit. The incremented memory register or variable may be stored in the computer system 100.

An application program or operating system utility may include functionality for determining values for the resource statistics of interest for building the model at the client. Examples of such application programs and utilities include SOLARIS™ mpstat, MICROSOFT® WINDOWS® Task Manager, Linux sysstat utilities, Linux perf kernel profiler tool, and INTEL® Performance Counter Monitor. The resource statistics may be determined by making a call to the application program or operating system utility that includes the functionality for determining the resource statistics.

The application program or system utility that includes the functionality for determining the resource statistics may include various executable commands, algorithms, and subroutines specifically designed to determine each of the designated resource statistics. For example, in the SOLARIS mpstat utility that reports CPU statistics, the executable commands include "xcal" to report inter-processor cross-calls, "intr" to report interrupts, "ithr" to report interrupts as threads (not counting clock interrupts), "csw" to report context switches, "icsw" to report involuntary context switches, "migr" to report thread migrations (to another processor), "smtx" to report spins on mutexes (lock not acquired on first try), "srw" to report spins on readers/writer locks (lock not acquired on first try), "syscl" to report system calls, "usr" to report percent user time, and "sys" to report percent system time. As another example, the Linux perf stat command counts cache misses, CPU migrations, and context switches, among other performance statistics.

In an example, the computing system 100 may iterate through sending messages of $\log_2(x)$ kbits in size from the client to the server for two minutes in one stream for two minutes, then in four streams for two minutes, then in sixteen streams for two minutes, then in 64 streams for two minutes, where x ranges from ten to twenty in increments of one. During each of these two-minute periods, the computing system 100 may measure the throughput in Mbits/s while also measuring resource statistics to use for building a model, for example, a count of thread migrations, a count of inter-processor cross-calls, a count of system calls, and a count of interrupts as threads.

Once the computing system 100 has collected the throughput data and resource statistics data from all the messages sent from the client to the server, the computing system 100 may determine correlations between the different measured resource statistics. If there is a measured resource statistic that is determined to be highly correlated with another measured resource statistic, one of the highly correlated resource statistics may be elected to be disregarded when generating the model from the collected throughput data and resource statistics data.

The computing system 100 may generate the model from the collected throughput data and resource statistics data using a statistical machine learning algorithm or a neural network algorithm (Operation 230). The model may include a decision tree that computes data throughput as a function of a resource statistic. The model may include a plurality of decision trees that function in parallel with one another, and an output of the model may be determined by an average of the outputs of the plurality of decision trees. The model may be generated by the model generation module 140.

When a statistical machine learning algorithm is used to generate the model, a random forest decision tree algorithm or a boosting decision tree algorithm may be used to generate the model. These algorithms use a sequence of binary decisions to build decision trees. The leaf nodes of the decision trees provide the results according to the sequence of decisions based on the inputs to the model. The random forest decision tree algorithm and boosting decision tree algorithm involve producing multiple trees, e.g., a forest of trees, that are combined to yield a single consensus prediction of the data throughput when given resource statistics in a regression tree analysis. The single combined tree considers all the resource statistics that are used to build the model. The decision tree algorithms take as input the measured throughput data and the associated resource statistics from all the measurements taken in Operations 210 and 220. The resource statistics are considered the predictors for the decision tree model. The decision tree algorithms keep track of which predictors are used for making decisions at each decision point in building the trees in order to determine which predictors are the best predictors for the estimated throughput. An output of the model, in addition to the estimated throughput, is therefore also a percentage of usefulness or value as a predictor for each of the predictors. The sum of the percentages of usefulness of all the predictors equal 100%.

The computing system 100 may determine a second set of values for at least one resource statistic for the computing system 100 when the data throughput is not known or when it is desired to compare currently measured data throughput with the model (Operation 240). This period of time may be a diagnostics period, when the previously generated model is used to estimate throughput and perform diagnostics of a computing system, operating system, or hardware. The at least one resource statistic for which the second set of values are determined during the second period may be the same or different than the at least one resource statistic for which the first set of values are determined during the first period. In other words, less than the full set of resource statistics used to generate the model may be provided to the model as input to estimate the data throughput.

Once the second set of values for the at least one resource statistic are determined (Operation 250), the computing system 100 may call the model with the second set of values to estimate the data throughput corresponding to the computing system 100 during the second period of time. When the model includes a boosting decision tree or random forest decision tree model, for example, the model may use the second set of values to traverse the forest of decision trees. For example, in one of the trees in the forest, the first decision point may be whether a particular resource statistic is greater than or less than a specific value, and then the next decision point reached based on the result of the first decision may further narrow the field of possible values for the resource statistic until a leaf node for the tree is reached. Each decision point may be according to a specific one or more resource statistics. The leaf node for the tree may provide an estimated data throughput based on the set of resource statistics provided to the model according to the traversed tree. The results provided by the leaf nodes reached by all the trees in the forest of trees may be averaged together to reach the final result for the model output of estimated data throughput. The results provided by the model may also include a listing of which resource statistics provided to the model are most important to the final result for the model output of estimated data throughput and/or a percentage of the final result that each resource statistic contributed to the final result. This information may be determined by the model execution according to how often the resource statistic is used during the tree traversal relative to other resource statistics provided to the model.

In addition to estimating the throughput, the computing system 100 may also identify any differences between current measured throughput and estimated throughput, and use the model to identify sources or reasons for those differences. In this way, the model may be a diagnostics tool for the computing system 100. Also, if there are changes in the computing system 100 configuration, e.g., the operating system, the model may be used to determine if the changes introduce any performance problems by comparing estimated throughput determined by using the model in combination with resource statistics of the changed computing system with measured throughput of the computing system before the changes. The model can provide useful information to identify areas to investigate for sources of problems introduced by the changes so that the sources of the problems may be addressed and corrected.

Figure 3:
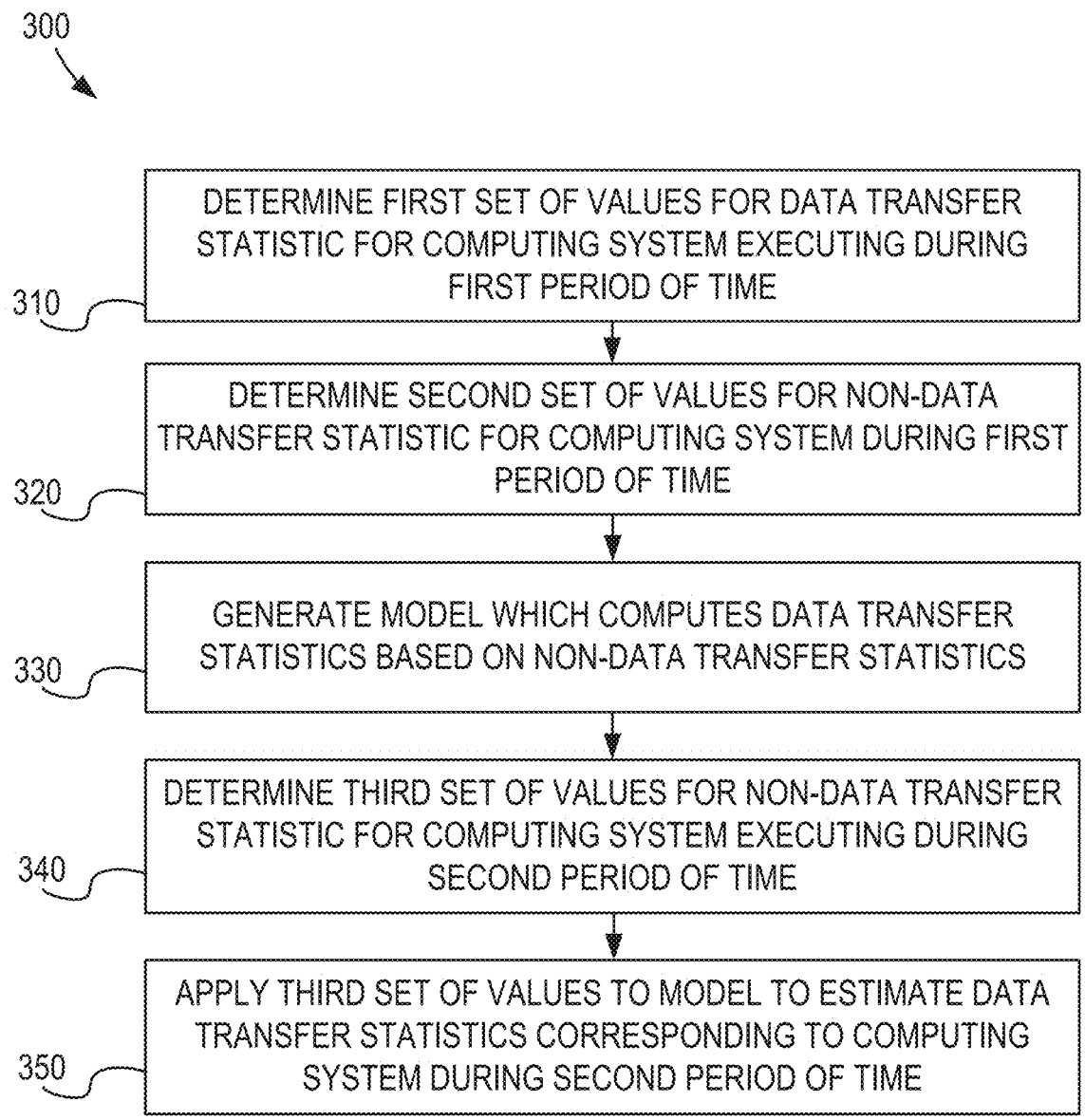
FIG. 3 is a flow chart that illustrates an example set of operations of generating and applying a model which computes data transfer statistics based on non-data transfer statistics of a computing system in accordance with one or more embodiments.

FIG. 3 is a flow chart that illustrates an example set of operations 300 of generating and applying a model which computes data transfer statistics based on non-data transfer statistics of a computing system in accordance with one or more embodiments. The computing system may be an embodiment of the computing system 100 illustrated in FIG. 1. The operations 300 may be performed by the computing system 100. One or more operations illustrated in FIG. 3 may be modified, rearranged, or omitted altogether. Accordingly, the particular sequence of operations illustrated in FIG. 3 should not be construed as limiting the scope of one or more embodiments. A detailed example is described below for purposes of clarity. Components and/or operations described below should be understood as one specific example which may not be applicable to certain embodiments. Accordingly, components and/or operations described below should not be construed as limiting the scope of any of the claims. In various embodiments, the operations 300 may be performed using the systems and components described above with reference to FIGS. 1-9.

The computing system 100 may send a series of messages from a client machine to a server machine as described with reference to FIG. 2 to generate a model during a first period of time. The first period of time may be a training period, when the model is generated.

In an Operation 310, the computing system 100 may determine a first set of values for at least one data transfer statistic for a computing system executing during the first period of time. The at least one data transfer statistic may include measurements of the throughput for data transmissions corresponding to the computing system 100. The measurements may be performed as described with reference to Operation 210.

In an Operation 320, the computing system 100 may determine a second set of values for at least one non-data transfer statistic for a computing system executing during the first period of time. The at least one non-data transfer statistic may not include measurements of data transmissions corresponding to the computing system 100. The at least one non-data transfer statistic may include a resource statistic as discussed with respect to Operation 220 above.

In an Operation 330, the computing system 100 may generate a model which computes data transfer statistics based on non-data transfer statistics. The computing system 100 may determine the model based on the first set of values for the at least one data transfer statistic and the second set of values for the at least one non-data transfer statistic. The model may be generated by the model generation module 140. The model may be a type of a decision tree as discussed with respect to the model generation module 140. The model may be generated as described with reference to Operation 230 above.

In an Operation 340, the computing system 100 may determine a third set of values for at least one non-data transfer statistic for the computing system 100 executing during a second period of time. The second period of time may be a diagnostics period, when the model generated during the first period of time is used to estimate the data transfer statistic and perform diagnostics of a computing system, operating system, or hardware. The at least one non-data transfer statistic for which the third set of values are determined during the second period may be the same or different than the at least one non-data transfer statistic for which the second set of values are determined during the first period. In other words, less than the full set of non-data transfer statistics used to generate the model may be provided to the model as input to estimate the data transfer statistic.

In an Operation 350, the computing system 100 may apply the third set of values to the model generated in the Operation 330 to estimate the data-transfer statistics corresponding to the computing system 100 during the second period of time. In addition to estimating the data transfer statistics, the computing system 100 may also identify any differences between current measured data transfer statistics and estimated data transfer statistics, and use the model to identify sources or reasons for those differences. In this way, the model may be a diagnostics tool for the computing system 100. Also, if there are changes in the computing system 100 configuration, e.g., the operating system, the model may be used to determine if the changes introduce any performance problems by comparing estimated data transfer statistics determined by using the model in combination with non-data transfer statistics of the changed computing system with measured data transfer statistics of the computing system before the changes. The model can provide useful information to identify areas to investigate for sources of problems introduced by the changes so that the sources of the problems may be addressed and corrected. The Operation 350 may be performed in a manner as described above with respect to Operation 250.

Figure 4:
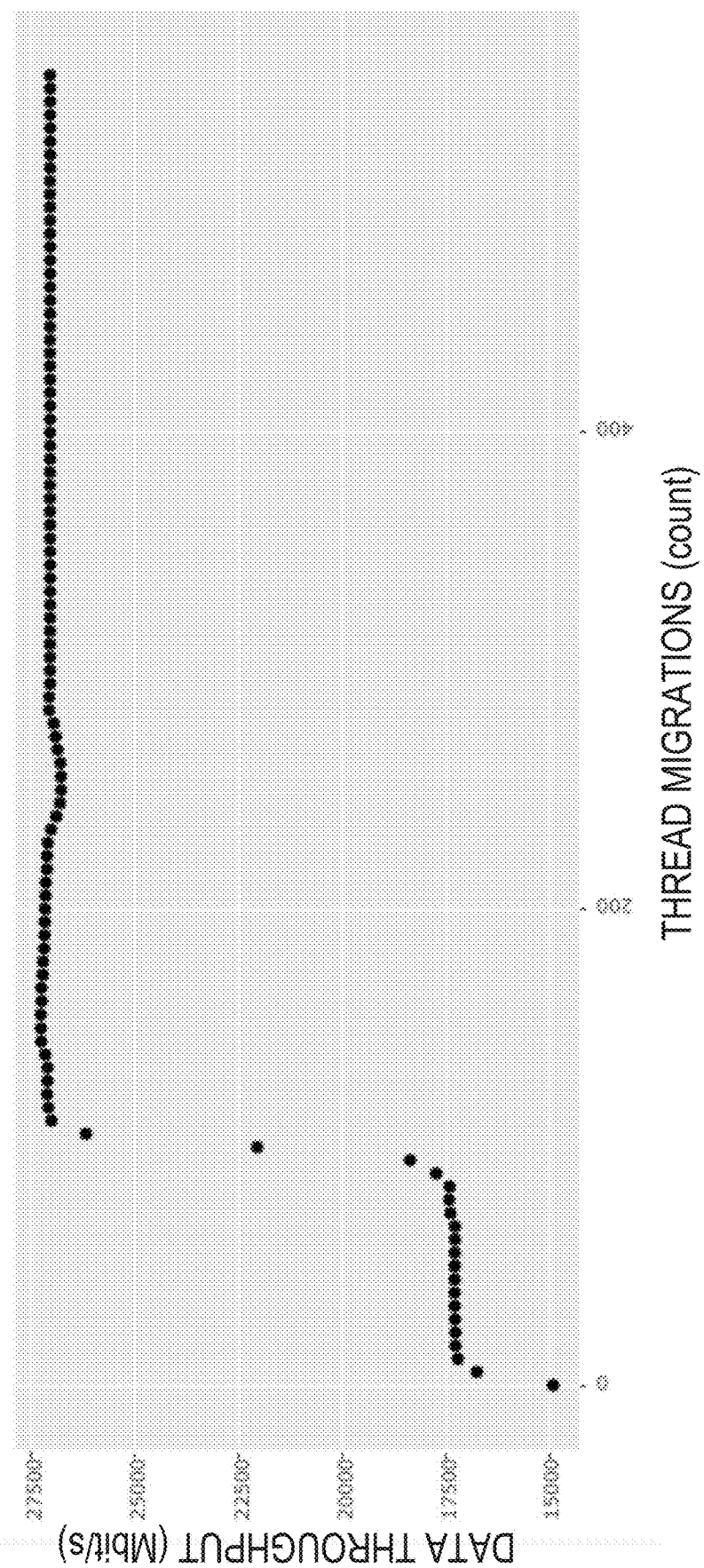
FIG. 4 shows a graph that illustrates a plot of a marginal effect of thread migrations resource statistic as a throughput predictor in accordance with one or more embodiments.

FIG. 4 shows a graph that illustrates a plot of a marginal effect of thread migrations resource statistic as a throughput predictor in accordance with one or more embodiments. As illustrated in the example of FIG. 4, as the number of thread migrations increases (illustrated in the x axis), the data throughput (illustrated in the y axis) increases in a non-linear fashion.

Figure 5:
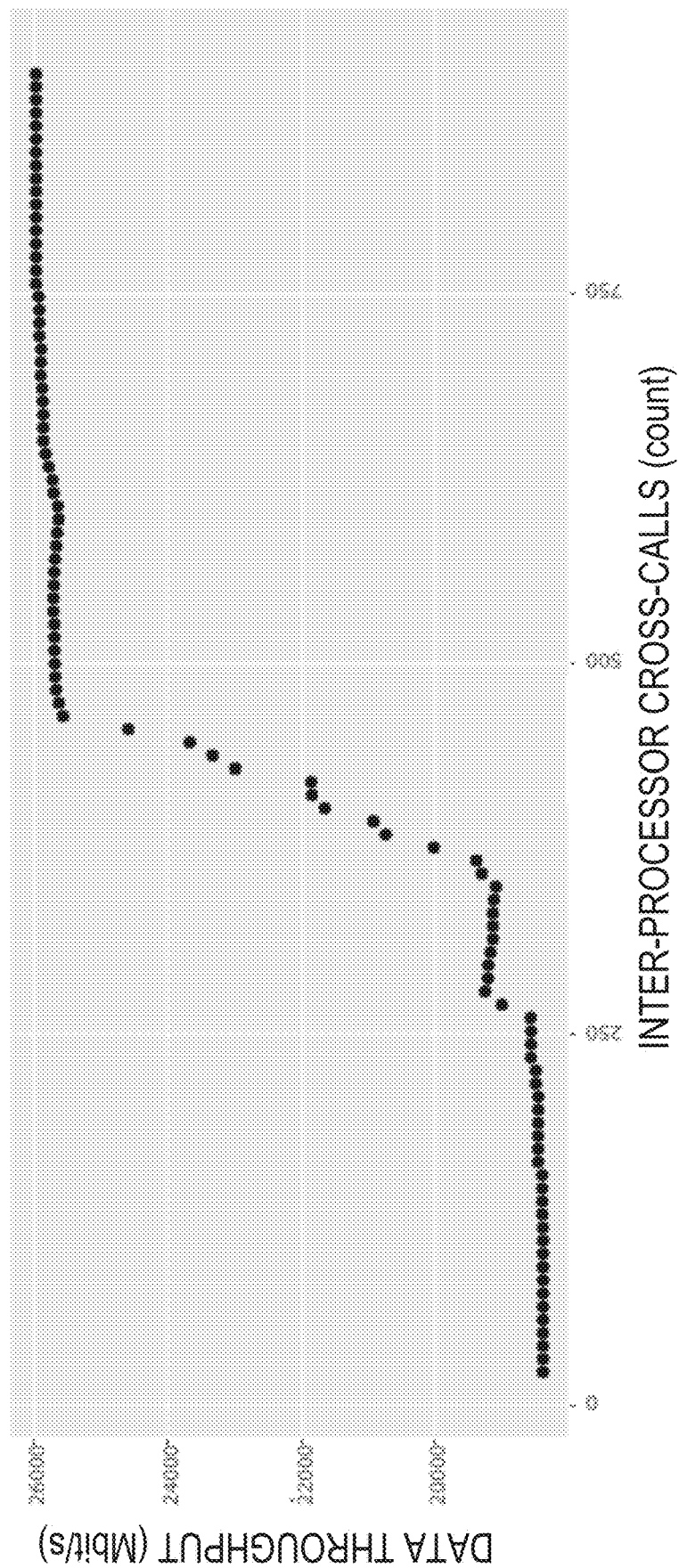
FIG. 5 shows a graph that illustrates a plot of a marginal effect of inter-processor cross-calls resource statistic as a throughput predictor in accordance with one or more embodiments.

FIG. 5 shows a graph that illustrates a plot of a marginal effect of inter-processor cross-calls resource statistic as a throughput predictor in accordance with one or more embodiments. As illustrated in the example of FIG. 5, as the number of inter-processor cross-calls increases (illustrated in the x axis), the data throughput (illustrated in the y axis) increases in a non-linear fashion.

Figure 6:
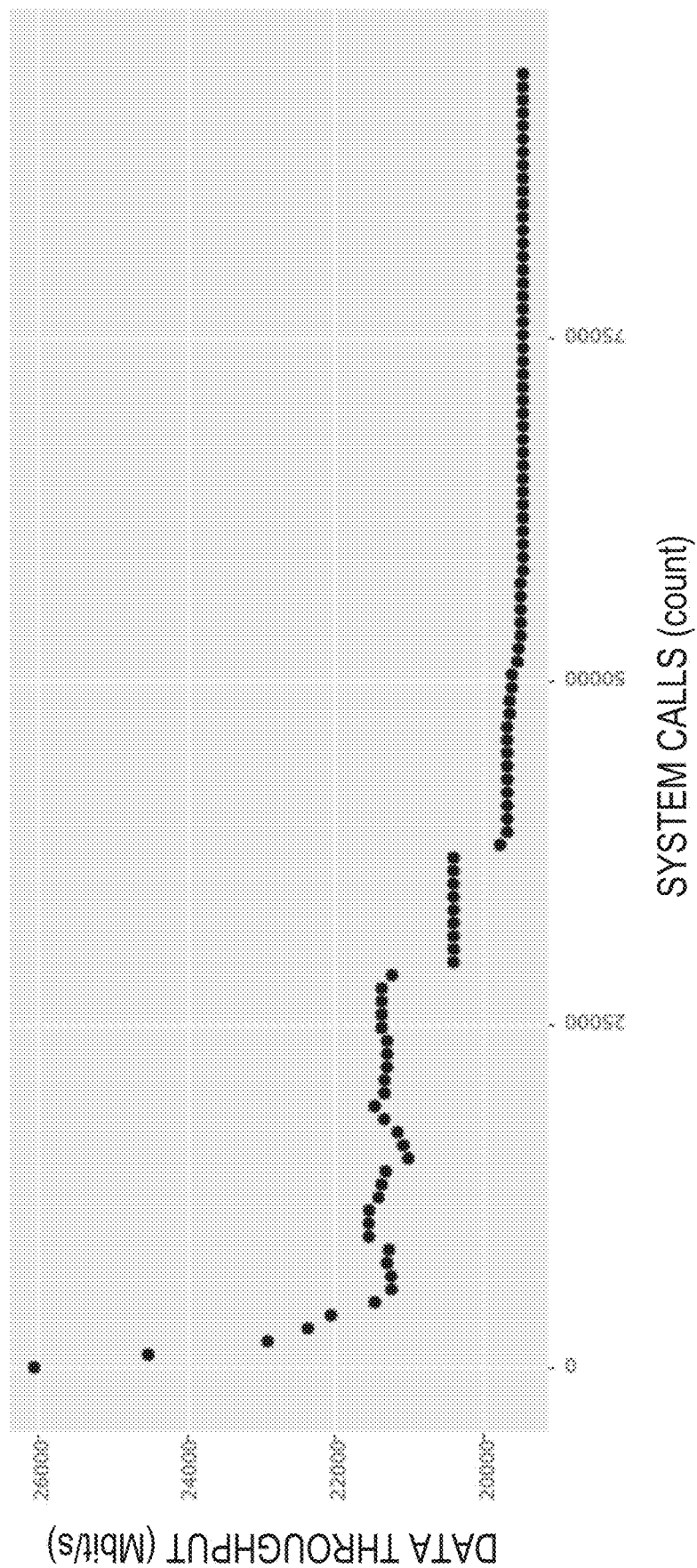
FIG. 6 shows a graph that illustrates a plot of a marginal effect of system calls resource statistic as a throughput predictor in accordance with one or more embodiments.

FIG. 6 shows a graph that illustrates a plot of a marginal effect of system calls resource statistic as a throughput predictor in accordance with one or more embodiments. As illustrated in the example of FIG. 6, as the number of system calls increases (illustrated in the x axis), the data throughput (illustrated in the y axis) decreases in a non-linear fashion.

Figure 7:
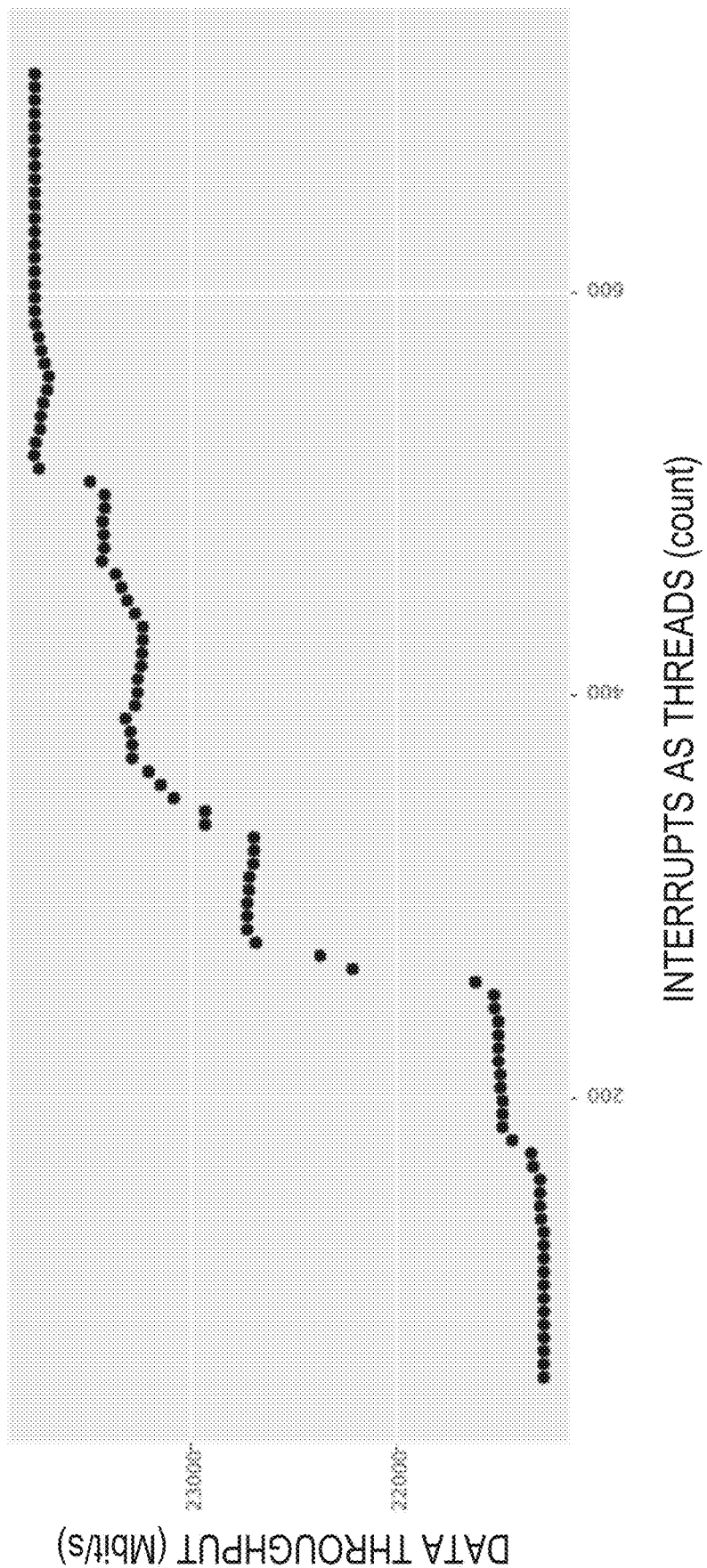
FIG. 7 shows a graph that illustrates a plot of a marginal effect of interrupts as threads resource statistic as a throughput predictor in accordance with one or more embodiments.

FIG. 7 shows a graph that illustrates a plot of a marginal effect of interrupts as threads resource statistic as a throughput predictor in accordance with one or more embodiments. As illustrated in the example of FIG. 7, as the number of interrupts as threads (not counting clock interrupts) increases (illustrated in the x axis), the data throughput (illustrated in the y axis) increases in a non-linear fashion.

Figure 8:
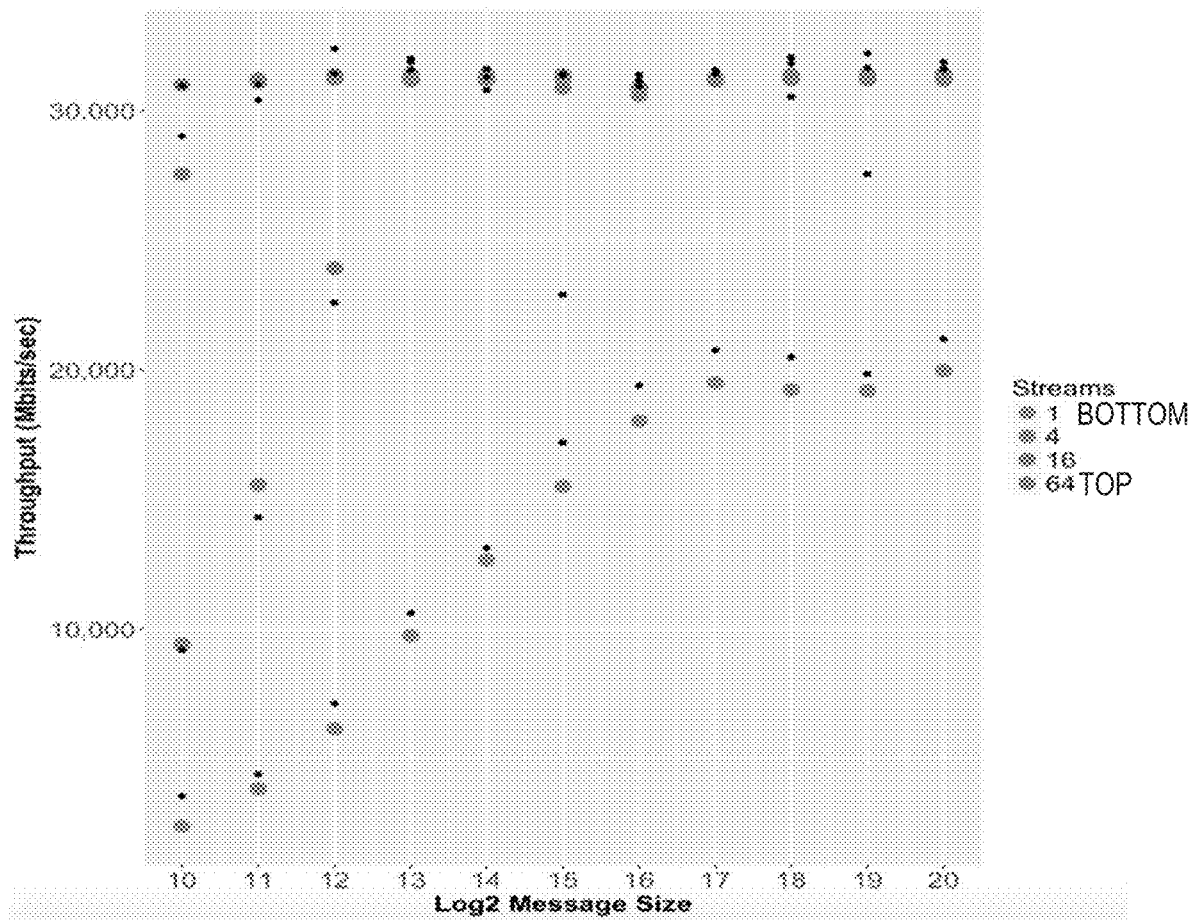
FIG. 8 shows a graph that illustrates measured throughput vs. predicted throughput according to a model in accordance with one or more embodiments.

FIG. 8 shows a graph that illustrates measured throughput vs. predicted throughput according to a model in accordance with one or more embodiments. A mean square error (MSE) may be calculated between measured data throughput (large dots) and predicted data throughput (small dots). The graph of FIG. 8 illustrates plots of measured throughput with one stream, four streams, sixteen streams, and sixty-four streams in large dots ordered from bottom to top as well as plots of predicted throughput from the model in small dots in each y axis column from Log 2(10) to Log 2(20) message size. The graph of FIG. 8 shows that the model, e.g., the throughput model 180, accurately predicts throughput for a computing system in most circumstances, as the small dots are mostly shown close to or within the corresponding large dots. As illustrated, the predicted data throughput for the two data points for the 4 streams curve at Log 2(15) and Log 2(19) had the greatest MSE compared to the measured data throughput.

Systems and methods discussed herein may predict data throughput by generating a model using resource statistics and machine learning or neural network techniques. The model may also be useful for performance regression testing of computing systems. For example, if a boosting decision tree model is used and the MSE of a measured data throughput of a system under test compared with the predicted data throughput of the model is greater than the MSE when the boosting decision tree model was trained, then the system under test may be considered to be exhibiting a performance regression.

As another example, data throughput predictions of multiple different models may be compared against one another. For example, a first model may be based upon a first set of resource statistics, while a second model may be based upon a second set of resource statistics. The different models may be compared against one another. The two different models may show that different resource statistics have different relative importances and correlations with one another. The predictions of the two models may also be compared against measurement data, and if one model accurately predicts data throughput and one model does not, the model that does not accurately predict data throughput may be evaluated to determine the resource statistics that are clues to the problem with the model. As a twist on this example, if the first model relates to a first version of an operating system and the second model relates to a second version of an operating system, then evaluating the second model can help identify the changes in the second version of the operating system that lead to performance problems. As another twist on this example, if there are differences in the resource statistics between the first model and the second model, the differences in the resource statistics can help to identify the changes in the operating system between the operating system on which the first model was based and the operating system on which the second model was based.

Data throughput for a computing system may be represented using more than one model at different periods of time, and machine learning or neural networks may be used to train and/or update the different models. In some cases, one model may be more accurate than another model, more than one model may be executed simultaneously, and all models that are executed simultaneously may have their outputs or results combined, e.g., averaged, to produce a final result. In some embodiments, a difference of the models may be detected to determine when there is a change in the computing system and the change may be flagged for investigation or the models may be updated by additional training, e.g., via execution of machine learning or neural network algorithms, when the change is flagged.

Application-level performance regression testing may be performed by evaluating the MSE of a baseline of the data throughput when a model was generated and comparing with the MSE of the data throughput of the system under test. Then, the resource statistics of the system under test may be evaluated to determine what changes may have been made relative to the baseline system when the model was generated. In addition to comparing before and after a change has been made to a given system, different systems within a network may be compared to determine whether a particular system has a problem that needs to be addressed in order to ensure that all systems are consistent with one another in their performance. This capability facilitates diagnosing problems with servers in the cloud. The predictive power of the model also facilitates predicting throughput degradation by monitoring hardware and operating system performance of a computing system in real time.

Systems and methods as discussed herein overcome problems of manual analysis by facilitating cause and effect coupling and analysis of joint behavior between performance statistics and operating statistics to identify changes that may be made in operating systems to improve applications' performance and what changes may cause a performance regression.

4. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

5. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 9:
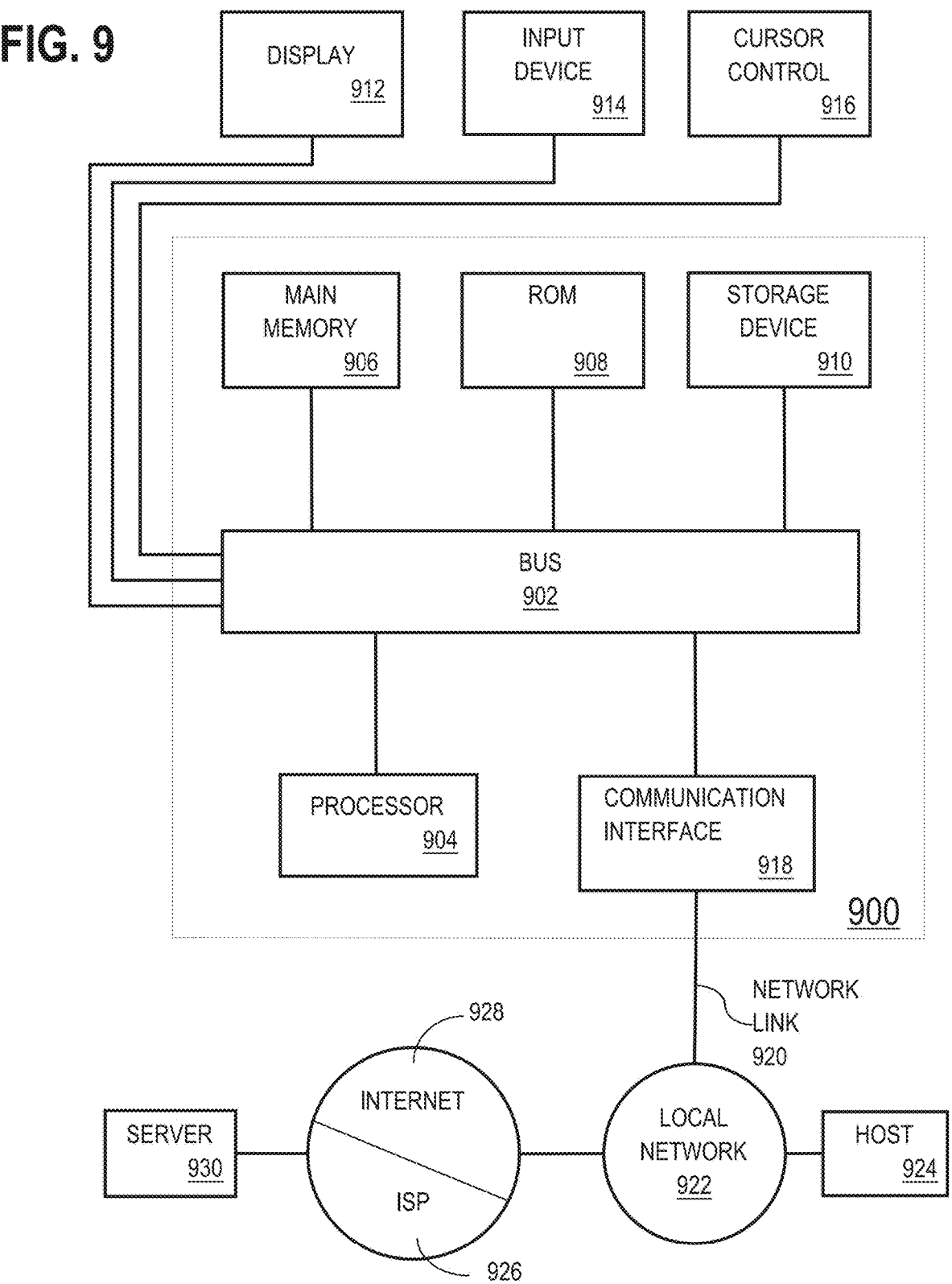
FIG. 9 is a block diagram that illustrates a computer system, in accordance with one or more embodiments.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general-purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into the remote computer's dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as the code is received, and/or stored in storage device 910, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    determining, by a resource monitoring module associated with a computing system, a first set of values for at least one resource statistic for the computing system executing during a first period of time;
    measuring, by a data monitoring module associated with the computing system, throughput for data transmissions corresponding to the computing system during the first period of time; and
    training a model, based on the first set of values for the at least one resource statistic and the measured throughput for the data transmissions during the first period of time, to compute throughput as a function of the at least one resource statistic,
    wherein the at least one resource statistic does not include any measurements of the throughput for data transmissions corresponding to the computing system;
    wherein the method is performed by at least one device including a hardware processor.

2. The method of claim 1, wherein the at least one resource statistic includes information corresponding to a processor, CPU, core, thread, memory, and/or cache utilization corresponding to the computing system.

3. The method of claim 1, wherein the at least one resource statistic includes information corresponding to a processor, CPU, core, thread, memory, and/or cache saturation corresponding to the computing system.

4. The method of claim 1, wherein determining the model which computes throughput as a function of the at least one resource statistic comprises executing a boosting decision tree algorithm.

5. The method of claim 1, wherein determining the model which computes throughput as a function of the at least one resource statistic comprises executing a random forest algorithm.

6. The method of claim 1, wherein determining the model which computes throughput as a function of the at least one resource statistic comprises executing a neural network algorithm.

7. The method of claim 1, wherein determining the model which computes throughput as a function of the at least one resource statistic comprises executing a statistical machine learning algorithm.

8. The method of claim 1, further comprising:
    determining a second set of values for the at least one resource statistic for the computing system executing during a second period of time; and
    applying the second set of values to the model to estimate the throughput for data transmissions corresponding to the computing system during the second period of time.

9. The method of claim 1, wherein the computing system includes an operating system executing on a machine, and the at least one resource statistic is an operating system resource statistic for the operating system.

10. The method of claim 1, wherein the computing system includes a machine, and the at least one resource statistic is a hardware statistic for the machine.

11. The method of claim 1, wherein the computing system includes a transmitting device and the at least one resource statistic includes an aggregate throughput value of data received from the transmitting device at a plurality of receiving devices.

12. The method of claim 1, wherein the at least one resource statistic comprises thread migration.

13. The method of claim 1, wherein the at least one resource statistic comprises inter-processor cross-calls.

14. The method of claim 1, wherein the at least one resource statistic comprises an operating system resource statistic that has a correlation value above a threshold with a thread migration statistic.

15. The method of claim 1, the operations further comprising:
after training the model, executing one or more of machine learning or a neural network algorithm to update the model based on one or more changes to the computer system.

16. A method comprising:
determining a second set of values for at least one resource statistic for a computing system executing during a second period of time;
training a model to estimate throughput as a function of the at least one resource statistic, the model determined by correlating
  (a) a determined first set of values for the at least one resource statistic for the computing system executing during a first period of time, wherein the first set of values for the at least one resource statistic is determined using a resource monitoring module associated with the computing system, with
  (b) the throughput for data transmissions during the first period of time, wherein the throughput for data transmissions during the first period of time is determined using a data monitoring module associated with the computing system;
wherein the at least one resource statistic does not include any measurements of the throughput for data transmissions corresponding to the computing system;
wherein the method is performed by at least one device including a hardware processor.

17. The method of claim 16, wherein the computing system includes a transmitting device that transmits the data transmissions during the first period of time and transmits the data transmissions during the second period of time.

18. The method of claim 16, wherein the computing system includes a receiving device that receives the data transmissions during the first period of time and receives the data transmissions during the second period of time.

19. The method of claim 16, further comprising:
applying the second set of values to the model.

20. A method comprising:
determining, by a resource monitoring module associated with a computing system, a first set of values for at least one data transfer statistic for the computing system executing during a first period of time, wherein the at least one data transfer statistic comprises measurements of throughput for data transmissions corresponding to the computing system;
determining, by a data monitoring module associated with the computing system, a second set of values for at least one non-data transfer statistic for the computing system during the first period of time, wherein the at least one non-data transfer statistic does not include any measurements of the throughput for data transmissions corresponding to the computing system;
training a model to estimate data transfer statistics based on non-data transfer statistics, based on the first set of values for the at least one data transfer statistic and the second set of values for the at least one non-data transfer statistic;
wherein the method is performed by at least one device including a hardware processor.

* * * * *